(12) United States Patent
Mayer et al.

(10) Patent No.: US 9,032,201 B2
(45) Date of Patent: May 12, 2015

(54) HIDING A DEVICE IDENTITY

(75) Inventors: Georg Mayer, Vienna (AT); Peter Leis, Penzberg (DE); Gunther Horn, Munich (DE)

(73) Assignee: Nokia Corporation, Espoo (FI)

(*) Notice: Subject to any disclaimer, the term of this patent is extended or adjusted under 35 U.S.C. 154(b) by 290 days.

(21) Appl. No.: 13/121,649

(22) PCT Filed: Sep. 4, 2009

(86) PCT No.: PCT/FI2009/050708
§ 371 (c)(1),
(2), (4) Date: Mar. 29, 2011

(87) PCT Pub. No.: WO2010/034879
PCT Pub. Date: Apr. 1, 2010

(65) Prior Publication Data
US 2011/0197058 A1 Aug. 11, 2011

(30) Foreign Application Priority Data
Sep. 29, 2008 (EP) ..................................... 08105459

(51) Int. Cl.
*H04W 12/02* (2009.01)
*H04L 29/12* (2006.01)
*H04L 29/06* (2006.01)
*H04W 80/10* (2009.01)

(52) U.S. Cl.
CPC .......... *H04W 12/02* (2013.01); *H04L 29/12594* (2013.01); *H04L 61/309* (2013.01); *H04L 63/0414* (2013.01); *H04W 80/10* (2013.01)

(58) Field of Classification Search
CPC ...................................................... H04L 61/309
USPC .......................................................... 713/150
See application file for complete search history.

(56) References Cited

U.S. PATENT DOCUMENTS

| 2007/0002831 A1* | 1/2007 | Allen et al. | 370/352 |
| 2010/0037045 A1* | 2/2010 | Schneyer et al. | 713/150 |

FOREIGN PATENT DOCUMENTS

| EP | 1 737 192 A1 | 12/2006 |
| EP | 1737192 A1 | 12/2006 |
| EP | 1887752 A1 | 2/2008 |
| WO | 2006/011017 A1 | 2/2006 |

OTHER PUBLICATIONS

"3$^{rd}$ Generation Partnership Project; Technical Specification Group Core Network and Terminals; IP Multimedia (IM) Core Network (CN) subsystem Centralized Services (ICS); Stage 3 (Release 8)", 3GPP TS 24.292 V1.0.0, Sep. 2008, 134 pgs.

(Continued)

*Primary Examiner* — Dant Shaifer Harriman
(74) *Attorney, Agent, or Firm* — Harrington & Smith

(57) ABSTRACT

The present invention relates to hiding a device identifier (IMEI) in a communication system. Identifying a device is done by indicating an international mobile equipment identity (IMEI) as an instance identifier of the device of a user. Generating a globally routable user agent uniform resource identifier (GRUU) for the user is done by encrypting the instance identifier so that the GRUU comprises an identity of the user and the encrypted instance identifier.

16 Claims, 3 Drawing Sheets

(56) References Cited

OTHER PUBLICATIONS

"3rd Generation Partnership Project; Technical Specification Group Services and System Aspects; IP Multimedia Subsystem (IMS); Stage 2 (Release 8)", 3GPP TS 23.228, v8.5.0, Jun. 2008, pp. 1-240.

Rosenberg, "Obtaining and Using Globally Routable User Agent (UA) URIs (GRUU) in the Session Initiation Protocol (SIP)", Cisco, Oct. 11, 2007, pp. 1-82.

International Search Report received for corresponding Patent Cooperation Treaty Application No. PCT/FI2009/050708, issued Nov. 20, 2009, 13 pages.

* cited by examiner

HIDING A DEVICE IDENTITY

RELATED APPLICATION

This application was originally filed as PCT Application No. PCT/FI2009/050708 filed Sep. 4, 2009, which claims priority benefit from European Patent Application No. 08105459.5, filed Sep. 29, 2008.

TECHNICAL FIELD OF THE INVENTION

The invention relates to a method, network entity and computer program product for hiding a device identity in a communication network.

BACKGROUND OF THE INVENTION

Within the IP (Internet Protocol) Multimedia Subsystem (IMS) as defined by $3^{rd}$ Generation Partnership Project (3GPP) Session Initiation Protocol (SIP) defined by Internet Engineering Task Force (IETF) is used for controlling communication. SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these.

Different types network entities and functions exist in the IMS network. Call Session Control Functions (CSCF) implement a session control function in SIP layer. The CSCF can act as Proxy CSCF (P-CSCF), Serving CSCF (S-CSCF) or Interrogating CSCF (I-CSCF). The P-CSCF is the first contact point for the User Equipment (UE) within the IMS; the S-CSCF actually handles the session states in the network; the I-CSCF is mainly the contact point within an operator's network for all IMS connections destined to a subscriber of that network operator, or a roaming subscriber currently located within that network operator's service area.

The functions performed by the I-CSCF are, for example, assigning an S-CSCF to a user performing SIP registration and routing SIP requests received from another network towards the S-CSCF. The S-CSCF performs the session control services for the UE. It maintains a session state as needed by the network operator for support of the services and may be acting as Registrar, i.e. it accepts registration requests and makes its information available through the location server (e.g. HSS). The S-CSCF is the central point to users that are hosted by this S-CSCF. The S-CSCF provides services to registered and unregistered users when it is assigned to these users. This assignment is stored in the Home Subscriber Server (HSS).

A mobile services switching centre (MSC) is a mobile telephone exchange element which performs the switching functions in its area of operation and controls the interworking with other networks.

In the Session Initiation Protocol (SIP), address-of-records (AOR)s are used to refer to users of the system. However, in SIP systems a single user can have a multiple end devices (handsets, softphones, voicemail accounts, etc.) which are all referenced by the same AOR. There are a number of situations in which it is desirable to have an identifier which addresses a single user agent (i.e. device) rather than the group of user agents indicated by an AOR.

There exist certain challenges to identify the end device of the user when the UE issues a registration directly to the IMS and when also an MSC server issues a registration on behalf of a UE.

SUMMARY OF THE INVENTION

The aspects of the present invention overcome the above drawback by providing a network entity, a method and a computer program, comprising identifying a device by indicating an international mobile equipment identity (IMEI) as an instance identifier of the device of a user, generating a globally routable user agent uniform resource identifier (GRUU) for the user by encrypting the instance identifier, wherein the globally routable user agent uniform resource identifier (GRUU) comprises an identity of the user and the encrypted instance identifier.

A network entity is provided, comprising means for receiving a request associated with a user and including an instance identifier of a device of the user, means for encrypting the instance identifier, means for forming a globally routable user agent uniform resource identifier (GRUU) for the user, wherein the globally routable user agent uniform resource identifier (GRUU) comprises an identity of the user and the encrypted instance identifier, and means for transmitting the globally routable user agent uniform resource identifier (GRUU) to the user.

The identity of the user can be not encrypted form in the globally routable user agent uniform resource identifier, or the identity of the user can be present in clear text form in the globally routable user agent uniform resource identifier. The identity of the user can be an address-of-record (AOR) of the user. The identifying may be performed by the device of the user, and/or the generating may be performed by a registration entity of the communication system. The encrypting can comprise encrypting based on encryption parameters and the encryption parameters can comprise at least one of an encryption key and an encryption algorithm. The globally routable user agent uniform resource identifier (GRUU) can comprise an indication of the encryption parameters. The identifying and generating steps can be performed in connection with a session initiation protocol registration procedure. Further, for identifying the device of the user, the globally routable user agent uniform resource identifier comprising the encrypted international mobile equipment identity (IMEI) as the instance identifier can be included in a service request transmitted in the communication system.

Aspects of the present invention can have one or more of following advantages:
  allow to use IMEI as instance identifier
  allow to protect the privacy of the user identity by keeping the IMEI secure, i.e. encrypted—which is a feature that is already required in current network deployments, e.g in GSM, UMTS and LTE.
  does not require involvement or standardization by the IETF.

DETAILED DESCRIPTION OF THE INVENTION

Figure 1:
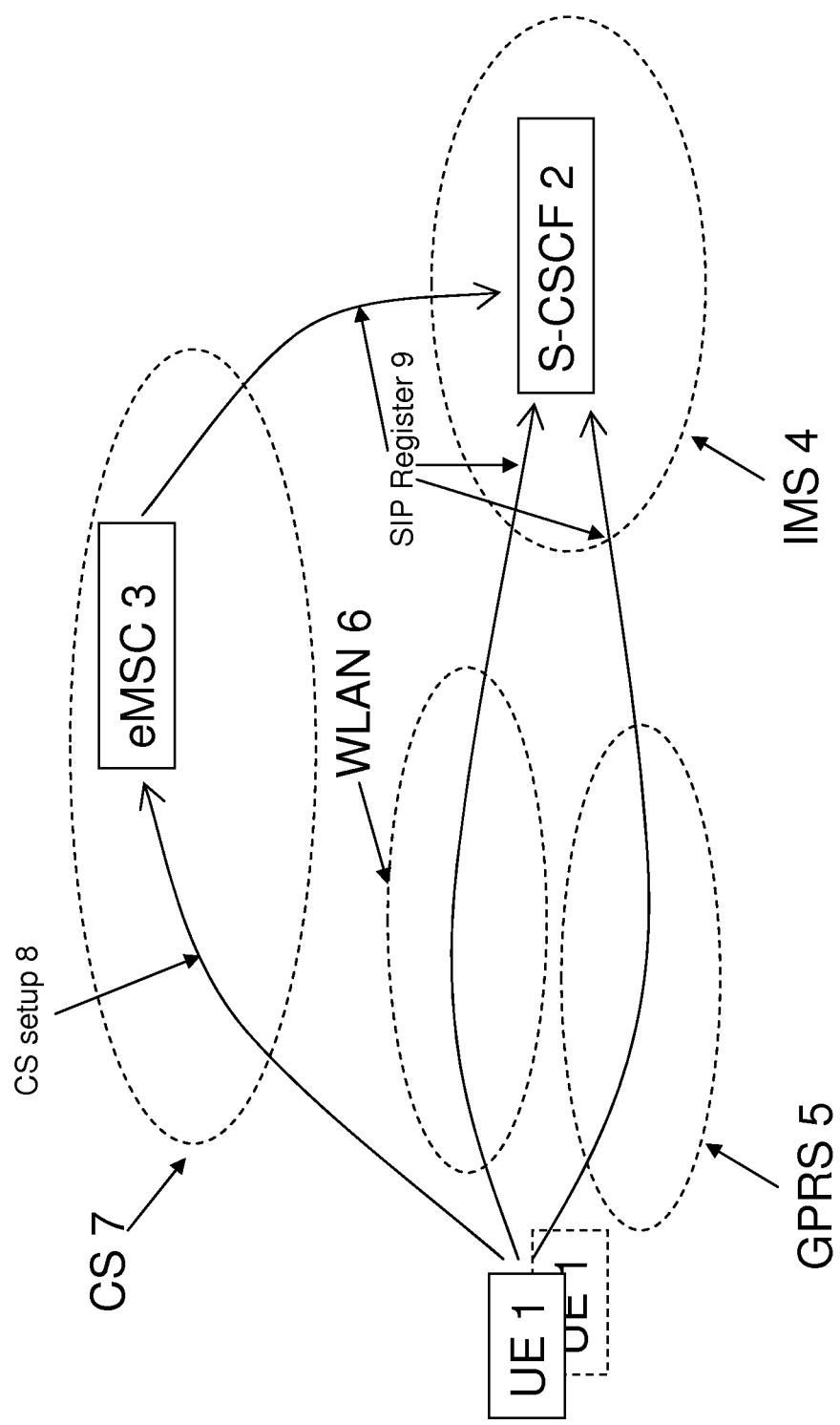
FIG. 1 illustrates network architecture relevant for embodiments of the invention.

An address-of-record (AOR) is a SIP uniform resource identifier (URI) that points to a domain with a location service that can map the URI to another URI where the user might be available. An address-of-record can be thought of as the public address of the user.

Applications of the SIP can require a user agent (UA) or user to construct and distribute a uniform resource identifier (URI) that can be used by anyone on the Internet to route a call to that specific UA instance, i.e. to that same physical device. A URI that routes to a specific UA instance is called a Globally Routable UA URI (GRUU) which has been specified by the IETF. A GRUU is a SIP URI that point to a specific device in the network and can be used globally to refer that device.

A GRUUs is generated by SIP domains, for example by an S-CSCF of an IMS network, and the GRUU route back to a SIP proxy (e.g. to S-CSCF) in that domain. The domain in turn maintains the binding between the GRUU and the particular UA instance (device). The proxy receiving a GRUU can map the GRUU to the contact for the particular UA instance (device), and forward the request to that.

Two type of GRUUs exist, GRUUs which expose the underlying AOR and GRUUs which hide the underlying AOR as explained in the IETF specification "Obtaining and Using Globally Routable User Agent (UA) URIs (GRUU) in the Session Initiation Protocol (SIP)" (draft-ietf-sip-gruu-15):
Public GRUU:

A GRUU can be constructed so that the mapping to the AOR is apparent. For example, many user agents retain call logs, which keep track of incoming and outgoing call attempts. If the UA has made a call to a GRUU (e.g. as a consequence of a transfer request), the call log can contain a GRUU. Since the call log is rendered to the user, it would be useful to be able to present the user with the AOR instead, since the AOR is meaningful to users as an identifier. A public GRUU is constructed by taking the AOR, and adding the "gr" URI parameter with a value chosen by the registrar (e.g. S-CSCF) in the domain. The value of the "gr" URI parameter contains a representation of the UA instance. For instance, if the AOR was "sip:alice@example.com", the GRUU can be:
   sip:alice@example.com;gr=kjh29x97us97d If a UA removes the "gr" URI parameter, the result is the AOR. Some systems can ignore unknown parameters, hence a public GRUU can "look" like the AOR to those systems.
Temporary GRUU:

Sometimes it is desirable to construct a GRUU that obfuscates the AOR such that it cannot be extracted by a recipient of the GRUU. A temporary GRUU can thereby protect the user's privacy. In such cases, the GRUU can have any content provided that it meets the basic requirements of GRUU, and the AOR cannot be readily determined from the GRUU. The GRUU can have the "gr" URI parameter, either with or without a value.

A UA can obtain a GRUU as part of a registration transaction. When doing so the UA can obtain a GRUU via a REGISTER request by providing an instance ID in the "+sip.instance" Contact header field parameter, defined by the IETF, for example:
   Contact: <sip:callee@192.0.2.2>
   ;+sip.instance="<urn:uuid:f81d4fae-7dec-11d0-a765-0a0c91e6bf6>"

The registrar (e.g. S-CSCF) detects this header field parameter and provides a GRUU to the UA in response to registration, e.g. in 200 OK SIP response.

For 3GPP Rel-8, the IM CN subsystem supports IMS Centralized Services (ICS). For ICS there exists a requirement that a GRUU for a UE must be identical independently of the registration procedure, i.e. must be the same when the UE issues a REGISTER directly to the IMS and when an MSC server enhanced for ICS (eMSC) issues a REGISTER on behalf of a UE. Hence the same instanceID must be used in order to get the same GRUU. One possibility is to use international mobile equipment identity (IMEI) as an instanceID. The IMEI is an identity with which the mobile station can be uniquely identified as a piece or assembly of equipment. The IMEI is the serial number of the device. The IMEI often appears on the label located on the back of the phone and can be automatically transmitted by the phone when the network asks for it.

FIG. 1 presents network architecture relevant for an embodiment of the invention. A user (not shown) can have multiple devices UE 1 for accessing services of a communication system, such as the IMS 4. The user can access services and register the UE 1 to the IMS in various ways, for example, via GPRS 5 access network, via WLAN 6 access network or via circuit switched (CS) 7 network. In the latter case, the UE 1 can communicate with an enhanced MSC (eMSC) 3 using CS protocols 8 and the eMSC 3 which can implement SIP UA for the user can register the user to the IMS 4 on behalf of the UE 1. In the IMS 4, SIP REGISTER requests 9 can be transmitted to an S-CSCF 2 that performs the registration. Other network elements, such as I-CSCFs, may be in a communication path but are not shown in the figure. The S-CSCF 2 when performing the registration can communicate with other network elements (not shown), such as a home subscriber server (HSS) or a service centralization and continuity application server (SCC AS).

A UE can be registered several times with the same public user identity to the IMS. These registrations can either originate directly from the UE via so-called Gm interface (i.e. from different packet switched (PS) domains) or can be initiated by an MSC Server enhanced for ICS (eMSC) on behalf of the UE.
For Example:

User A can have public user identity tel:+35812345 registered from UE A1 in the following ways:
   a) via GPRS (or WCDMA)/IP-address 1.2.3.4
   b) via WLAN/IP-address a.b.c.d
Access Technologies:
WLAN=wireless local area network,
GPRS=general packet radio service
WCDMA=wideband code division multiple access In addition this UE can be attached to the eMSC, which can register on behalf of the UE to the S-CSCF. The related IP address can for example be a.f.f.e.
   c) via eMSC/IP-address a.f.f.e A UE, when registering to the IMS, shall always use the same instance-ID, in order to force the S-CSCF to assign the same GRUU for all registrations of this particular device. This instance-ID must uniquely identify the device. As a consequence of the above, the eMSC (see c) above) should also indicate the same instance-ID in order to get the same GRUU as in a) and b). One possible identifier that could be used to identify the device is IMEI, that can be used as a base for the instance-ID. The IMEI itself can be sent in clear-text format as part of the instance-ID from the UE to the S-CSCF. When creating the GRUU, the S-CSCF can simply take the instance-ID and append it to the users AOR.
For Example:
   Users AOR: sip:userA@home1.net
   User Contact (e.g. in case a)):
   Contact:
   <sip:1.2.3.4>;+sip.instance="<urn:uuid:11d0-a765-00a0c91e6bf6>"
GRUU as Assigned by S-CSCF:
   sip:userA@home1.net;gr=urn:uuid:11d0-a765-00a0c91e6bf6

If the IMEI is used as an instance-ID, the GRUU can, if normal handling is applied, include the IMEI in clear text. The GRUU (i.e. the IMEI) can then later on indicated by the UE in outgoing session in the Contact header. However the IMEI can indicate (in sort of a semi-permanent relation) the identity of the calling user, as a user normally uses a specific device over a long time, i.e. the user identity can directly be derived from the device-ID (IMEI). This means, that if the IMEI is used in clear text for the instance-ID and later on in the GRUU, any remote UE (e.g. also SIP UEs in the internet, outside the IMS) could receive the clear-text IMEI which operators and manufacturers can find as unwelcome privacy issue.

Embodiment of the invention proposes how usage of IMEI in GRUU can be secured. According to aspects of the invention the clear-text IMEI string can be hidden or encrypted, in order to not offer the IMEI information to the outside world.

According to aspects of the invention, a UE 1 sends the clear-text IMEI as an instance-ID to the S-CSCF during registration. The S-CSCF 2 encrypts the IMEI string when generating the GRUU. The S-CSCF 2 can return the so-created GRUU (with encrypted IMEI) to the UE 1, and the UE1 can use the encrypted GRUU in further service requests.

For Example:
 Users AOR: sip:userA@home1.net
 Users IMEI (simplified): i-m-e-i
 User Contact:
  Contact: <sip:1.2.3.4>;+sip.instance="<urn:uuid:i-m-e-i>"
 A GRUU that can then be assigned by S-CSCF 2:
 sip:userA@home1.net;gr=urn:uuid:e-n-c-r-y-p-t-e-d According to another aspect of the invention a basic encryption mechanism that can be used by the S-CSCF is disclosed. The encryption can be based on
 an encryption key (K), which is identified by a Key-Identifier (KeyID)
 an encryption algorithm, which is identified by an Algorithm-Identifier (AlgId)

The S-CSCF can then generate a token by computing Token=enc(K; IMEI) and can include this token in the GRUU.

Because the GRUU can be valid over several registrations, and the S-CSCF which is assigned to a user may change from one registration to the next, the encryption mechanism, i.e. the key K and the encryption algorithm, should be identical for all S-CSCFs within one network. For example only one key and one algorithm could be enough, but as algorithm/keys might be breached, the operator can have a protocol mechanism to change both.

In one aspect of the invention, the GRUU exists of a concatenation of the following:
 AOR (public user identity) of the user
 GRUU parameter ";gr="
 the KeyID
 the AlgId
For Example:
Users AOR: sip:userA@home1.net
 Users IMEI (simplified): urn:uuid:i-m-e-i
 Token, enc(K; i-m-e-i): encrypt
 KeyID; 1
 AlgorithmID: 2
 GRUU as assigned by S-CSCF:
 sip:userA@home1.net;gr=encrypt12

In aspects of the invention the UE does not need to know the keys used for securing the GRUU. The S-CSCF encrypts the incoming instanceID (in REGISTER) and returns it to the UE. The UE can use the encrypted value and S-CSCF(s) can have a table that shows the encrypted value for later use.

Aspects of the invention secure the instanceID which is used in the public GRUU defined by the IETF, when the instanceID can hold the security sensitive IMEI. Aspects of the invention does not hide or anonymize the sender of the message (user and domain part of the GRUU) as the use of a temporary GRUU defined by the IETF can do.

Figure 2:
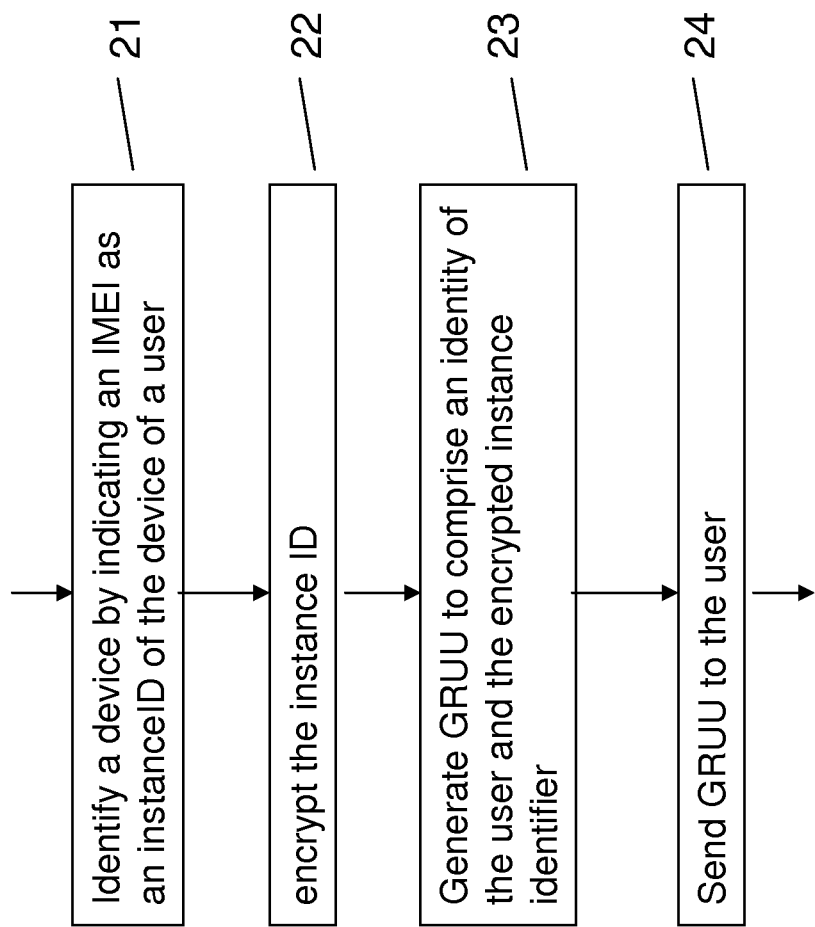
FIG. 2 presents an aspect of the invention in which an IMEI as instance identifier in encrypted.

FIG. 2 describes an embodiment of the invention. Identifying 21 a device of a user can be done by indicating an IMEI as an instance identifier (instanceID of IETF GRUU) of the device of a user. The IMEI as instanceID can be transmitted in a Contact header of SIP, for example, in SIP REGISTER request from the UE 1 or the eMSC 3 to the S-CSCF 2. The instance identifier can then be encrypted 22 for example by the S-CSCF 2 or by another network element which can be, for example, involved in the registration procedure. The encryption 22 can be made using encryption parameters, such as an encryption key and/or an encryption algorithm. The GRUU can then be formed 23 so as to include at least an identity of the user, such as AOR, and the encrypted instance identifier. The identity of the user can be present in clear text form in the GRUU, or without encryption. If encryption parameters have been used in the encryption the generating 23 of the GRUU can include inserting an indication of the encryption parameters in the GRUU. The GRUU can be transmitted 24 to the user, for example in a 200 OK response to the SIP REGISTER request. When accessing services, the UE 1 can include the GRUU in signaling messages to identify itself globally, without disclosing the IMEI.

Figure 3:
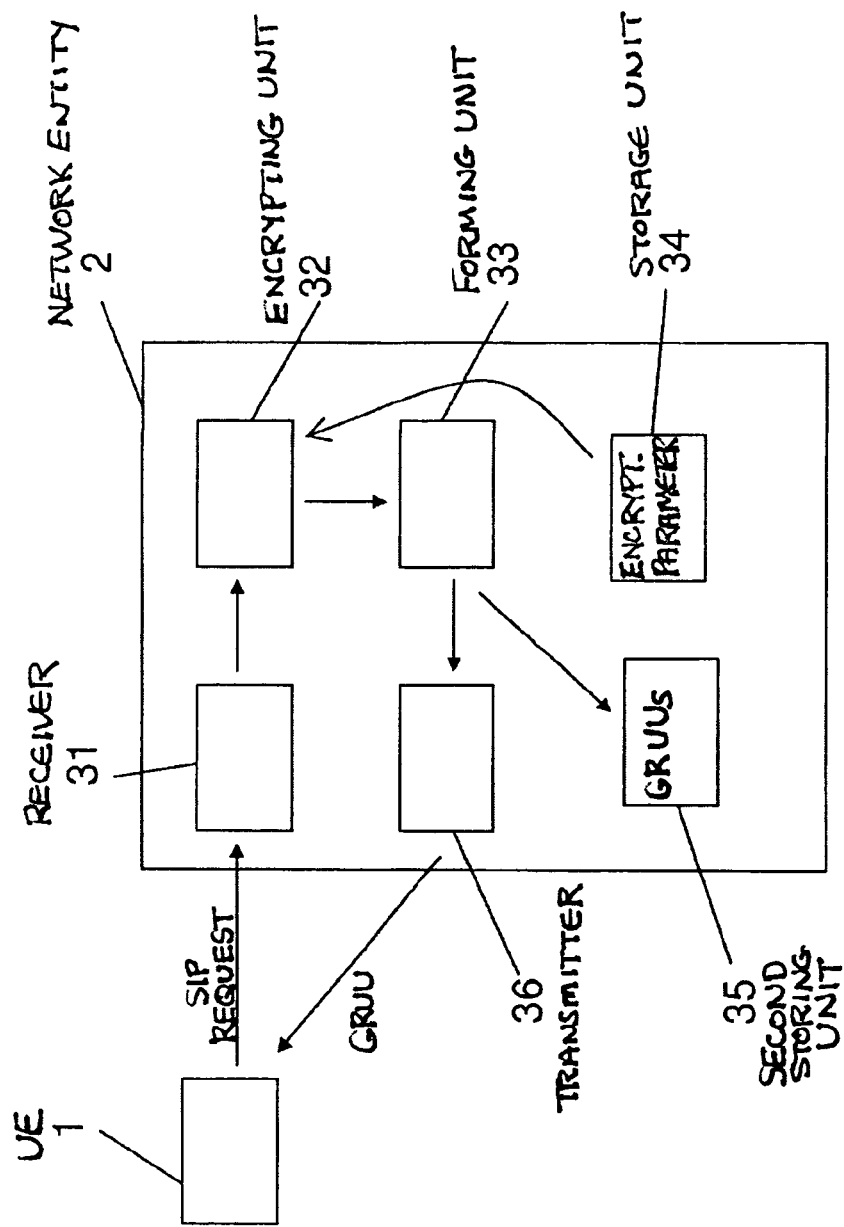
FIG. 3 illustrates the internal structure and functions of the network element implementing aspects of the invention.

FIG. 3 illustrates internal structure and function of a network entity implementing aspects of the invention. A network entity 2, such as an S-CSCF, can have a receiving unit (receiver) 31 configured to receive a request, such as SIP REGISTER or other SIP request, associated with a user and including an instance identifier of a device of the user. The instance identifier can be instanceID of IETF defined GRUU and can include an IMEI of the device. The encrypting unit 32 can be configured to encrypt the instance identifier, and can use encryption parameters for performing the encryption, for example, an encryption key and an encryption algorithm. The network element 2, can have a storing unit (storage) 34 configured to store multiple encryption parameters, for example encryption keys and encryption algorithm. The stored encryption parameters can have identifiers which can be used to referring those. The storing unit 34 can transmit encryption parameters to the encrypting unit 32. The forming unit 33 can be configured to form a GRUU for the user for example so that the GRUU comprises an identity of the user, such as AOR, and the encrypted instance identifier. The forming unit 33 can place the identity of the user in the GRUU in clear text form (readable) and without encryption. If encryption parameters (Key, algorithm) with identifiers are used, the forming unit 33 can include an indication of the used encryption parameters (Key, algorithm) as part of the GRUU. The network element 2 can have a transmitting unit (transmitter) 36 configured to transmit the GRUU to the user, for example in a SIP request (200 OK etc). The network entity 2 can include a second storing unit 35 configured to store created GRUUs for later use.

All units described above may be implemented for example using microprocessors and/or other electrical components and/or by software.

The network entity can implement functions of a call state control function of an internet protocol multimedia subsystem.

A network entity may be physically implemented in a switch, router, server or other hardware platform or electronic equipment which can support data transmission and processing tasks, or can be implemented as a component of other existing device.

The invention is not limited to the IMS, but can also be applied in other type of networks having similar type of need to identify terminal devices of users. In particular the invention is applicable also to fixed mobile convergence (FMC) networks, as well as next generation networks (NGN). Therefore, the S-CSCF is only used here as examples of possible network element. Functions of a network entity described above may be implemented by code means, as software, and loaded into memory of a computer or similar platform.

The invention claimed is:

1. A method of hiding a device identifier in a communication system, said method comprising:
   identifying a device by indicating an international mobile equipment identity as an instance identifier of the device of a user;
   encrypting the instance identifier; and
   generating a public globally routable user agent uniform resource identifier for the user by combining the encrypted instance identifier with an identity of the user in clear text form.

2. The method of claim 1, wherein the identity of the user is an address-of-record of the user.

3. The method of claim 1, wherein at least one of the identifying is performed by the device of the user, and the generating is performed by a registration entity of the communication system.

4. The method of claim 1, wherein the encrypting comprises encrypting based on encryption parameters.

5. The method of claim 4 wherein the encryption parameters comprise at least one of an encryption key and an encryption algorithm.

6. The method of claim 5, wherein the globally routable user agent uniform resource identifier further comprises an indication of the encryption parameters.

7. The method of claim 1, wherein the identifying and generating are performed in connection with a session initiation protocol registration procedure.

8. The method of claim 1, further comprising including, for identifying the device of the user, the globally routable user agent uniform resource identifier comprising the encrypted international mobile equipment identity as the instance identifier in a service request transmitted in the communication system.

9. A network entity comprising:
   at least one processor and at least one memory storing computer instructions, the computer instructions adapted to cause, when run on the at least one processor, the network unit to at least:
   receive a request associated with a user and including an instance identifier of a device of the user;
   encrypt the instance identifier;
   form a public globally routable user agent uniform resource identifier for the user by combining an identity of the user in clear text form with the encrypted instance identifier; and
   transmit the public globally routable user agent uniform resource identifier to the user.

10. The network entity of claim 9, wherein the identity of the user is an address-of-record of the user.

11. The network entity of claim 9, wherein the encrypting comprises encrypting based on encryption parameters.

12. The network entity of claim 11 wherein the encryption parameters comprise at least one of an encryption key and an encryption algorithm.

13. The network entity of claim 12, wherein the globally routable user agent uniform resource identifier further comprises an indication of the encryption parameters.

14. The network entity of claim 13, wherein the network entity is a call state control function of an interne protocol multimedia subsystem.

15. The network entity of claim 14, wherein the request comprises registration request of a session initiation protocol.

16. A computer program product comprising a non-transitory computer-readable storage medium bearing computer program code embodied therein for use with a computer, the computer program code comprising code for performing the method of claim 1.

* * * * *